Oct. 4. 1927.  1,643,986
A. J. HARTLEY
POWER DRIVEN CONVEYER
Filed July 12, 1926
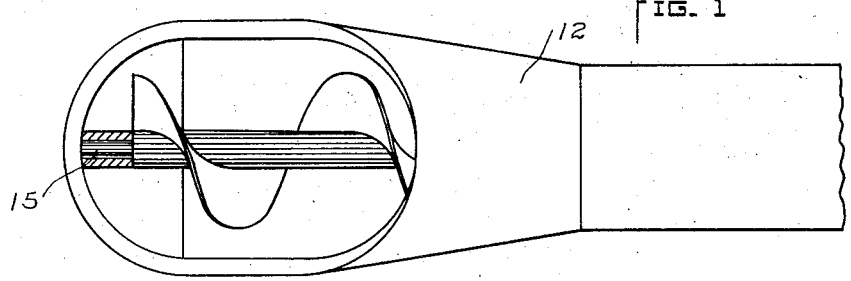
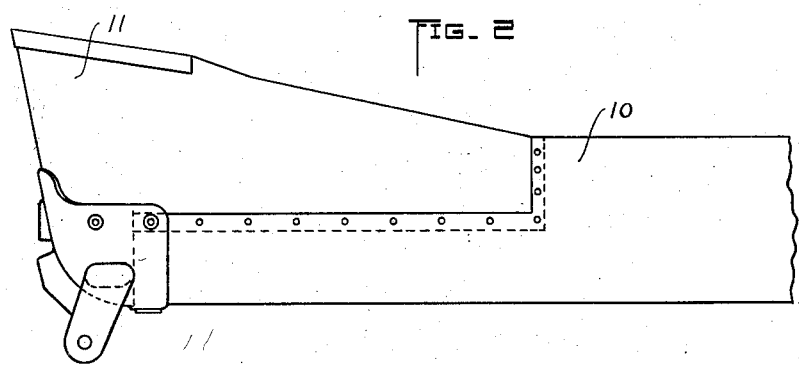
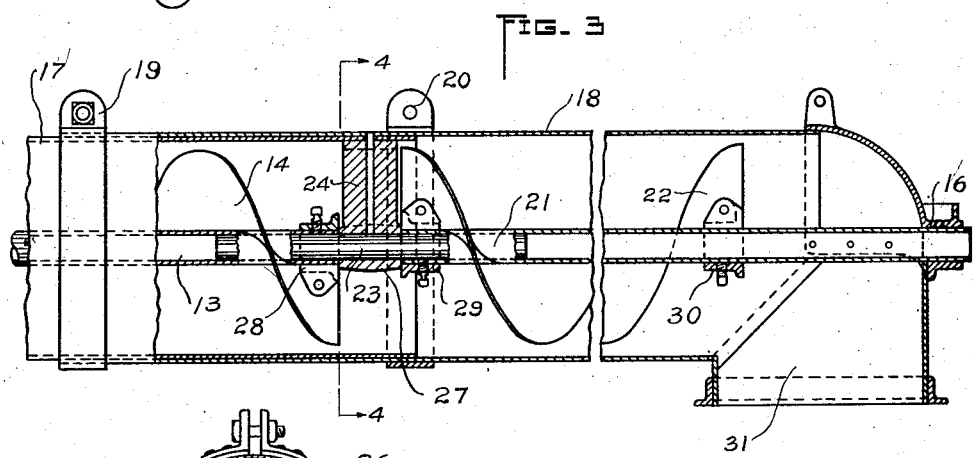
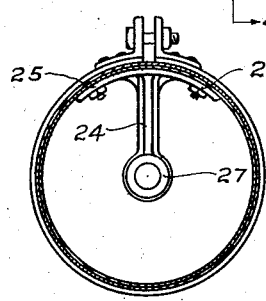
INVENTOR
Arthur J. Hartley
BY
Tefft and Tefft
ATTORNEYS Patented Oct. 4, 1927.

1,643,986

UNITED STATES PATENT OFFICE.

ARTHUR J. HARTLEY, OF PEORIA, ILLINOIS.

POWER-DRIVEN CONVEYER.

Application filed July 12, 1926. Serial No. 121,818.

This invention relates to power conveyers for grain elevating mechanism and the like.

One of the objects of the invention is in the provision of power conveying mechanism, the same being fashioned in such manner that an additional conveyer portion may be mounted thereon in a manner to extend the length thereof.

Another object is in the provision of a power conveying mechanism, fashioned to receive an extension conveyer portion, the same being adapted to be attached thereto with a minimum of mechanical connections.

Still another object is in the provision of a power conveyer for grain elevators and the like, the same being adapted to receive an extensible conveyer portion to materially increase the length thereof, said connection being effected in such manner that a bearing support is provided for the power element for the flighting.

A further object is in the provision of a power conveyer wherein the receiving hopper therefor is tapered with respect to the conveyer portion in a manner to materially increase the capacity of the conveyer.

A still further object is in the provision of a power conveyer having a receiving hopper fashioned in a manner to increase materially the delivering capacity thereof.

Other objects will appear in the following specification, taken in connection with the annexed drawings, in which—

Fig. 1 is a plan view, from above, of the receiving hopper for the conveyer;

Fig. 2 is a side elevation thereof;

Fig. 3 is a side elevation, partially in section, of the delivery end of the power conveyer, showing the manner of attaching the extensible portion thereto; and Fig. 4 is a cross-sectional view taken on the line 4—4 of Fig. 3.

Referring to the drawings, there is shown merely the details of the improved power conveyer, and it has not been shown in combination with a grain elevating device, to which, in practice, it is attached, in view of the fact that the present power conveying device may be utilized in connection with any type of elevating and delivering mechanism for grain or other materials.

It is apparent, however, that the present conveyer conforms generally, but not specifically, to the ordinary type of power conveying mechanism which is utilized in the elevation and delivery of grain.

In the drawings, 10 discloses a cylindrical housing member or casing for the conveying portions later to be described. The receiving end of the conveyer includes the receiving hopper 11, which is connected with the casing 10 in a tapered manner, as shown at 12. It might be stated that the conveyer, of well known design, includes the circular casing 10 and a hopper 11, with the exception that the receiving hopper is joined directly with the casing member, and there is no tapering, as in the present instance, of the receiving hopper with respect to said casing. Within the conveyer housing 10 is disposed a pipe 13, which acts to rotate the well known auger or flighting 14, which is securely attached thereto. The pipe has its inner end mounted in a bearing member 15 disposed in the boot of the receiving hopper. The opposite end of the pipe 13 is connected to a pipe 21, which is supported in a second bearing 16 in the delivery end of the conveyer, as shown in Fig. 3. A conveyer member of ordinary length has not been shown in the present drawings, inasmuch as this application is directed to the feature of providing an extensible conveyer portion to the delivery end of the ordinary conveyer with a minimum of mechanical connection.

Before describing the extensible conveyer portion and manner of connecting same to an ordinary conveyer, it might be stated that for substantially all purposes, a power conveyer member of ordinary length is satisfactory. However, it has been found that in the Northwest, an extremely long power conveyer is sometimes necessary to take care of extra high receiving members, and for this reason the present extensible portion was devised.

Describing the extensible power conveying portion, the delivery end of the ordinary conveyer has been designated 17, the delivery end, of course, having been removed to permit the attachment thereto of the extensible conveyer portion, which has the same cylindrical shape and is designated 18. This extensible conveyer portion 18, or rather the casing therefor, is of slightly greater diameter than the portion 17, and is adapted to telescope same in the manner shown in Fig. 3.

Means for fixedly connecting the casing 18 with the slightly smaller casing 17 is provided in the two clamps 19 and 20.

Referring to the connection of the pipe 13 within the extensible pipe portion 21, which carries the auxiliary extensible auger or flighting 22, it might be said that a stub shaft 23 connects the opposed ends of said pipe member, said pipe members conforming to the shape of the ends of said stub shaft in order to provide a rigid connection therebetween. A bracket 24 is bolted as at 25 and 26 within the cylindrical casing 17, said bracket supporting a bearing 27 in which the stub shaft 23 rotates. Means for connecting the ends of the flighting 14 and 22 to the pipe members 13 and 21 is provided in the connecting members 28 and 29 respectively, the same acting to provide a rigid attachment between said flighting ends and the pipe members. The opposite end of the auxiliary and extensible flight portion 22 is attached by a similar connecting member 30 to the pipe 21.

Further, with respect to the auger or flighting 14 and 22, it might be stated that said portions do not connect, as may be clearly seen in the drawings, and that a space intervenes therebetween at a point adjacent the bracket and bearing support 24. The grain, however, is readily forced across this intervening space and picked up immediately by the auxiliary and extensible flight portion 22, being delivered finally at the delivery portion 31.

Concerning the above described power conveyer, it may be readily seen that when the necessity arises of extending an ordinary conveyer, this extension may be readily accomplished by disposing the bearing support or bracket 24 within the open end of the conveyer, thereafter connecting the extensible pipe 21 and the main pipe 13 with the stub shaft 23, fixedly connecting the flight portions with respect to said pipe members, and thereafter sliding the auxiliary casing 18 over the casing 17 and fixedly clamping same thereto, the outer end of the extensible pipe 21 engaging the bearing support 16 on the delivery end of the extensible portion. It may be readily seen that this connection may be quickly accomplished with a minimum of effort and of mechanical connections.

Again, regarding the receiving hopper of the power conveyer, the same is tapered, as at 12, from the actual receiving portion towards the casing 17, to permit the grain conveying auger not only to pick up a larger amount of grain but also a more continuous supply than is permitted when such receiving hopper is fashioned in the well known manner, wherein same is connected directly with the conveyer casing and is not tapered with respect thereto.

What I claim is:

1. In a power conveyer, comprising a receiving hopper, a cylindrical conveyer casing, flight members mounted therein, a power shaft for said flight members, and an extensible portion for said power conveyer, including an auxiliary power shaft, and flight portion, means for connecting said extensible portion to said conveyer casing, including a supporting bearing and stub shaft and an auxiliary casing adapted to telescope with said first named casing, and means for clamping same in a fixed manner thereon.

2. In a power conveyer, including a receiving hopper, a casing member and a power driven flight member, means for increasing the length of said conveyer, comprising an auxiliary portion including an extensible power driven flight portion, means for supporting and attaching the opposed ends of said power driven flight portions, and an auxiliary telescoping casing adapted to be clamped to said first named casing.

3. In a power driven conveyer, including a conveyer casing, a power shaft suitably supported therein, an auger connected to said shaft and means for increasing the length of said power conveyer, including a detachable conveyer section, comprising an auxiliary power shaft, and auger attached thereto, means for connecting the opposed ends of said power shafts to permit a substantially continuous delivery action of the connected auger portions, a telescoping auxiliary conveyer casing, and means for clamping same with respect to the first named conveyer casing.

In testimony whereof I have hereunto affixed my signature.

ARTHUR J. HARTLEY.